July 10, 1951 R. G. DE LA MATER 2,560,092
SEALING MEANS FOR BOLTED STORAGE TANKS
Filed Feb. 17, 1948
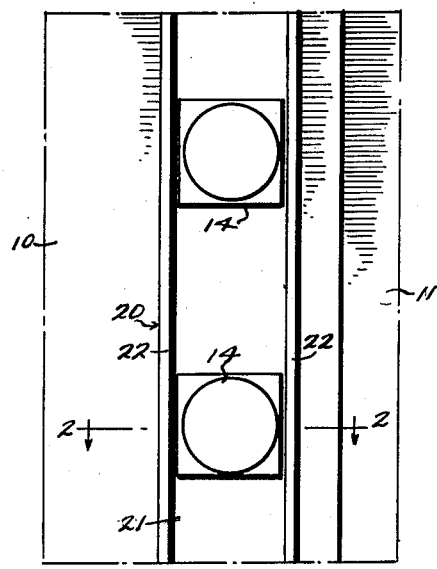
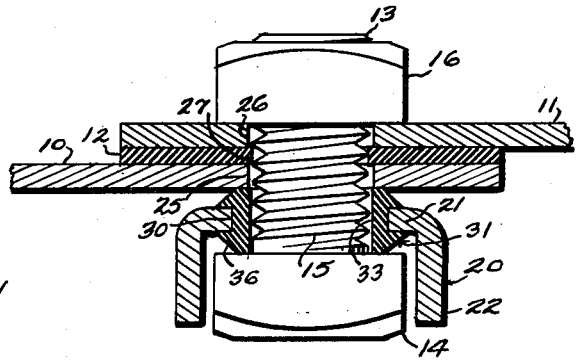
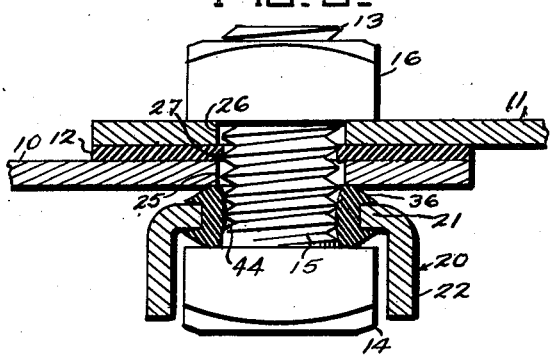
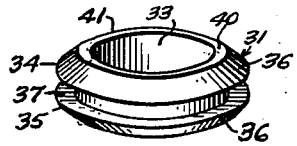
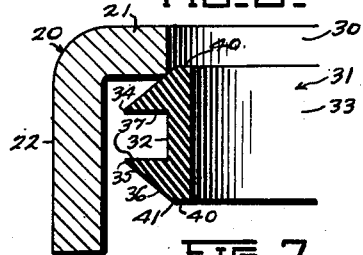
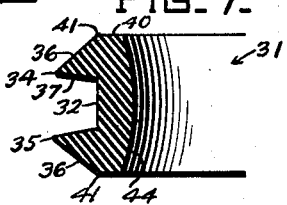
Inventor
ROBERT GRIFFIN DE LA MATER
By
ATTY

Patented July 10, 1951

2,560,092

UNITED STATES PATENT OFFICE 2,560,092

SEALING MEANS FOR BOLTED STORAGE TANKS

Robert Griffin De La Mater, Parkersburg, W. Va., assignor to The Parkersburg Rig & Reel Company, Parkersburg, W. Va., a corporation of West Virginia Application February 17, 1948, Serial No. 8,985

6 Claims. (Cl. 220—81)

This invention relates to sealing means for storage tanks.

In the manufacture of large steel tanks, for example, the storage tanks used in the oil industry, it is the common practice to fabricate the tanks by overlapping and bolting together a plurality of arcuate sheets or staves. Sealing gaskets are arranged between the overlapping edges of the sheets and bolts are employed for securing the sheets together in clamping relationship with the gaskets to provide leak-proof joints.

Because of the sizes of tanks of this character, it is the common practice to provide reinforcing channels adjacent the vertical joints between the sheets, and the bolts employed for clamping the vertical overlapping edges of the sheets pass through such channels and are prevented from turning thereby during erection of the tank and when subsequently tightening the bolts. Substantial difficulty has been encountered in sealing these bolts against leakage, it being found in practice that oil will seep from the tank around the bolts of the vertical seams, both from beneath the heads of the bolts within the channels and between the channels and the adjacent tank sheets.

A number of efforts have been made to provide a sealing washer or similar device adapted to surround the bolts to be deformed upon the tightening of the bolts and thus be forced tightly into the threads of the bolts and against the surfaces of the openings in the channels and tank sheets.

Devices of this character of which I am aware, are unsatisfactory and ineffective for several reasons. In the first place, such deformable devices are not of such form and are not so related in their shapes, positions, etc. to the elements with which they cooperate to be effectively substantially deformed into tight packing engagement with the bolt threads and openings. They do not effectively seal the tank against leakage for this reason, and they particularly fail to prevent the leakage of oil or other fluid between the reinforcing channels and the adjacent tank sheets.

From a practical installation standpoint, previous devices of this character also have been unsatisfactory. The erection in the field of large oil storage tanks usually is done on a job basis by men who are specialists in this particular field. In prior devices, it has been necessary to place the sealing washers or similar elements in position in the field when erecting the tanks, and considering the many thousands of bolts employed even in an average size oil storage tank, a great amount of time is required for the placing of one of the sealing elements in position with respect to each of the bolts of the reinforcing channel.

An important object of the present invention is to provide a sealing joint for liquid storage tanks, and particularly oil storage tanks, wherein a highly effective deforming of the sealing element is accomplished because of the nature of the sealing element itself and its relationship to the elements with which it cooperates.

A further object is to provide a novel type of sealing element in the form of a grommet adapted to be arranged in each bolt opening of a tank reinforcing channel, the grommet being of such type and character that practically all of the material thereof will be deformed into the openings in the channels and tank sheets, thus effectively sealing the bolts against leakage.

A further object is to provide a grommet made of deformable material for the purpose stated, wherein the characteristics of the structure are such that upon the tightening of the bolt, the flanges of the grommet are prevented from being held in frictional engagement with any of the bolt head, channel or tank surfaces, thus rendering the flanges of the grommet free to be deformed into the channel and tank sheet openings.

A further object is to provide such a grommet which extends beyond opposite sides of the base of a reinforcing channel to provide adequate material for performing the sealing function, and wherein the grommet is of such shape that the endwise deforming of the grommet incident to the tightening of the bolt tends to move the flanges of the grommet into the bolt openings to be sealed.

A further object is to provide such a device which readily may be installed in the channel bolt openings at the factory and shipped in operative position ready to receive the bolts, thus eliminating the necessity for the placing of the grommets by the tank erectors.

A further object is to provide a sealing grommet of this type wherein the shape of the grommet not only is such as to provide a highly effective seal against leakage, but is also such as to facilitate the placing of the grommets in the bolt opening of the channel at the factory and to facilitate the shipping and handling of the channels without displacement and loss of the grommets.

Other objects and advantages of the invention will become apparent during the course of the following description.

In the drawing I have shown one embodiment of the invention. In this showing:

Figure 1 is a fragmentary inside face view of a portion of a storage tank showing portions of a pair of overlapping sheets and the reinforcing channel associated therewith, the bolts being shown in position, Figure 2 is a substantially enlarged sectional view on line 2—2 of Figure 1, showing the parts in their initially assembled positions with one of the sealing grommets illustrated in its normal shape, Figure 3 is a similar view showing the approximate shape of one of the grommets after initial tightening of the associated bolt, Figure 4 is a similar view showing the parts in the final tightened position, Figure 5 is a detail perspective view of one of the grommets, Figure 6 is an enlarged sectional view of one of the grommets shown in its normal shape, a portion of the associated reinforcing channel and its bolt opening being shown in its relationship to the grommet when the operation of inserting the grommet in position is about to start, and Figure 7 is a similar sectional view of the grommet showing the relation of the parts thereof at the initial deforming stage illustrated in Figure 3.

Referring to Figures 1 to 4 inclusive, the numerals 10 and 11 indicate a pair of tank sheets or staves having their projecting edges in the overlapping relationship they assume in the fabricating of a storage tank, such as a conventional bolted oil storage tank. A deformable packing or gasket 12 is arranged between the overlapping edge portions of the sheets 10 and 11, and this gasket is adapted to be deformed, as will become apparent, upon the tightening of bolts 13. Each of these bolts has a head 14 and a shank 15 threaded in the usual manner to a point adjacent the head 14. Each bolt is provided with the usual nut 16.

Figures 2, 3 and 4 indicate one of the vertical seams of the tank adjacent which is arranged a reinforcing channel 20 having a base 21 and flanges 22. The bolt heads 14 employed in a structure of this character are usually square, as shown, and are of slightly smaller width than the space between the flanges 22 to facilitate the easy insertion of the bolts. However, the channel flanges prevent the turning of the bolt head 14 in the customary manner.

The shank of the bolt extends through openings 25 and 26 in the sheets 10 and 11, and a similar opening 27 is formed in the gasket 12. These openings need be only sufficiently large for the easy insertion of the shank in the bolt.

The base 21 of the channel is provided with an opening 30 larger than the openings 25, 26 and 27 for the reception of a sealing grommet indicated as a whole by the numeral 31 and formed of any suitable deformable material. The grommet is substantially spool shaped and is shown in its normal shape in Figures 2, 5 and 6. The grommet comprises a central cylindrical portion 32 having an axial opening 33 therethrough which is normally cylindrical, as shown in Figures 5 and 6. The grommet further comprises annular flanges 34 and 35 having conical remote faces 36 and parallel inner faces 37. The space between the faces 37 correspond generally to the thickness of the base 21 of the channel. The external diameter of the cylindrical portion 32 of the grommet is preferably very slightly smaller than the diameter of the opening 30 so as to be freely received therein.

The end surfaces 40 of the grommet are preferably flat and parallel to each other and these surfaces and the conical surfaces 36 intersect in a circular line 41 of a diameter slightly smaller than the channel opening 30, as shown in Figures 2 and 6.

As stated, the inner surface 33 of the grommet is normally cylindrical and when the grommet is initially deformed endwise as in Figure 3, the surface 33 starts to bulge inwardly as at 44. Upon the completion of the bolt tightening action, the material of the grommet will be completely deformed, as indicated by the numeral 45 in Figure 4. Some of the material will remain between the base 21 and the adjacent surfaces of the nut head 14 and sheet 10, as indicated by the numerals 46 and 47 in Figure 4. However, the thickness of this material is exaggerated in Figure 4 and in actual practice there will be substantially no thickness of the material of the grommet left at these points.

Operation

The grommets are assembled at the factory in the channel opening 30 instead of being assembled in the field, an operation to which the tank erectors object because of the time involved in placing several thousands of sealing elements of this type in position. As stated, the diameter of the line 41 is smaller than the diameter of the opening 30, and accordingly the grommet will be assembled in its bolt opening 30, it being initially placed in the position shown in Figure 6 with the edge of the opening 30 contacting with one of the conical surfaces 36. By pressing on the opposite side of the grommet, for example, with a suitable arbor, the grommet will wedge itself through the opening 30 and snap into the position shown in Figure 2.

All of the openings 30 of each channel 20 will be provided with one of the grommets at the factory. The conical formation of the faces 36 not only greatly facilitates the placing of each grommet in position in a matter of a second or two, but this formation also protects the grommet during shipment. The faces 37 lie snugly against opposite faces of the channel base 10 and any article rubbing against either surface 36, for example, another one of the channels 20, will not dislodge the grommet since the interfering article will simply slide upwardly over the contacted surface 36. Because of the shape of the grommet, it is much more easily inserted in position than dislodged, and accordingly the channels may be shipped without the loss of any of the grommets.

In assembling the tank, it is unnecessary for the erector to pay any attention to the grommets. The sheets will be assembled in the usual manner together with the channels, and the channels will be initially placed in position relative to the sheets, as shown in Figure 2. It will be noted that each surface 40 bears against the inner face of the sheet 10, the diameter of the cylindrical grommet opening 33 being preferably very slightly smaller than the diameter of the sheet opening 25 (usually about 1/64" for 1/2" bolt). A workman within the tank will insert one of the bolts 13, whereupon a second workman outside of the tank will place the nut 16 in position and tighten it. It will be noted that the grommet extends in opposite directions beyond the inner and outer faces of the channel base 20, which is an arrangement far superior to the placing of a cylindrical washer in the opening 20 since such a washer will permit the adjacent faces of the sheet 10 and channel base 21 to come into direct contact with each other, the washer thus having a substantial, if not the major, portion of its length arranged between the head 14 and base 21 so that the application of the pressure of the head 14 deforms the sealing device radially outwardly instead of axially.

With the present device, the engagement of the surface 32 in the opening 30 as the tightening action starts prevents radially outward deforming of the adjacent portion of the grommet. The relative stiffening of the grommet by the flanges 34 and 35 minimizes, and in fact, eliminates radially outward deforming of the flange portions of the grommet. As a result, the initial tightening of the nut 16 causes the grommet to assume the shape shown in Figures 3 and 7, the cylindrical surface 33 being bulged inwardly as at 44 toward the threads of the bolt. This initial deforming of the grommet axially thereof causes the faces 37 to diverge, as shown in Figures 3 and 7, thus eliminating any frictional contact between the flanges of the grommet and the channel base 21, which friction would interfere with the further initial deforming of the grommet, as referred to below.

The spreading or diverging of the faces 37 is due to the fact that as the grommet is deformed axially, the width of the cylindrical face 32 decreases to a point where it is less than the thickness of the channel base 21. This tends to pull the material of the flanges 34 and 35 into the opening 30 and it is this action which causes the diverging of the faces 37 and the moving of these faces out of any frictional contact with the channel base 21.

Further tightening of the bolt 13 additionally shortens the length of the surface 32, thus further pulling the flanges 34 and 35 into the channel opening 30. At the same time, the inward bulging of the inner surface of the grommet causes such surface to be forced by deformation into the threads of the shank 15 of the bolt. As the operation continues, the volume of the space for receiving the grommet decreases, and accordingly the deforming of the material of the grommet takes place endwise along the threads to secure the final deforming as indicated by the numeral 45 in Figure 4. In practice, the material left at the points 46 and 47 is extremely thin, most of the material being duly deformed against the surfaces of the openings 30 and 26 and some even being forced into the opening 27. The material is thus deformed in the most efficient possible manner to positively seal the bolt against any leakage of fluid therearound, either from within the channel 20 or between the channel and the adjacent tank plate 10.

With the sealing means now employed, leakage around some of the bolts inevitably starts shortly after the erection of a tank, and within a few days after such erection has been completed as a rule, it is necessary for the tank setter to be sent out to the tank to retighten the bolts. This involves substantial expense and loss of time. With the present device, it has been found that perfect sealing is accomplished at the time the tank is erected which cannot be attained with any previous sealing devices of which I am aware. Therefore, the present device eliminates the returning of the tank erectors for the retightening of the bolts.

It is a feature of the present construction that it seals any possible leak around the bolt at the possible sources of the leak, these sources being from under the bolt head, or from between the channel and the sheet, and then in either case along the threads of the bolt. To stop such leaks, it is the usual procedure after the bolt is inserted and prior to installing the nut, to push a rubber ring over the end of the bolt against the tank sheet 11, and then to place a conical washer over the bolt against the rubber ring. When the nut is then tightened, the washer is flattened and the material of the rubber ring is forced into the hole 26 of the sheet 11.

It will be noted that this procedure does not stop the leak at its source, and it is further disadvantageous for the reason that it requires more time in erecting the tank and thus is more expensive. Moreover, such conventional procedure requires two more elements per bolt and these elements must be provided and handled at the site. In the present case, the grommets 31 are not additional elements which require handling in the field. Nothing special must be handled, the nuts and bolts being standard. In conventional constructions, moreover, there is the possibility, particularly in case of any damage to or defects in the packing 12, that oil might seep from the inside of the tank along the bolt threads and escape from the tank from between the sheets 10 and 11. The present construction, as indicated, seals the tank at the source of possible leaks, namely, under the bolt heads and between the channels and the adjacent sheets 10.

From the foregoing it will be apparent that while the present device is extremely simple, it comprises a number of highly distinct advantages over prior constructions. The grommets are assembled at the tank factory, and the same formation of the grommet which is so highly effective in the performance of its final and intended purpose of sealing a tank, is such as to facilitate the insertion of the grommets in position and the shipment of the channels with the grommets in place and without any danger that the grommets will be displaced in shipment.

I claim:

1. In a bolted storage tank, in combination, a pair of overlapping sheets, a reinforcing member arranged to one side thereof, said sheets and said reinforcing member being provided with alined bolt-receiving openings, a bolt adapted to project through said openings, and a grommet surrounding said bolt and projecting through the opening in said reinforcing member and having portions projecting radially outwardly over opposite sides of said reinforcing member, said grommet being formed of deformable material whereby the tightening of said bolt will deform said grommet into leak-proof engagement with said reinforcing member and the adjacent sheet and with said bolt.

2. In a bolted storage tank, in combination, a pair of overlapping sheets, a reinforcing member arranged to one side thereof, said sheets and said reinforcing member being provided with alined bolt-receiving openings, a bolt adapted to project through said openings, and a grommet surrounding said bolt and having a body portion projecting through and beyond the opening in said reinforcing member, the ends of said grommet having outstanding annular flanges overlying opposite sides of said reinforcing member, the material of said grommet being deformable whereby the tightening of said bolt deforms said grommet into leak-proof engagement with said reinforcing member and the adjacent sheet and with said bolt.

3. In a bolted storage tank, in combination, a pair of overlapping sheets, a reinforcing member arranged to one side thereof, said sheets and said reinforcing member being provided with alined bolt-receiving openings, a bolt adapted to project through said openings, and a grommet surrounding said bolt, said grommet being formed of deformable material of spool-like shape arranged in the opening in said reinforcing member and projecting beyond opposite sides of such member, said grommet having outstanding annular flanges at its ends, the inner faces of which, in the normal shape of said grommet, lie in contact with the opposite sides of said reinforcing member whereby, upon the tightening of said bolt, said grommet will be deformed endwise to reduce the normal space between said inner faces of said flanges to cause them to diverge radially outwardly of the axis of said bolt to relieve any frictional contact between said inner faces and opposite sides of said reinforcing member, continued tightening of said bolt deforming said grommet into leak-proof engagement with said reinforcing member and the adjacent sheet and with said bolt.

4. In a bolted storage tank, in combination, a pair of overlapping sheets, a reinforcing member arranged to one side thereof, said sheets and said reinforcing member being provided with alined bolt-receiving openings, a bolt adapted to project through said openings, and a grommet surrounding said bolt, said grommet being formed of deformable material of spool-like shape arranged in the opening in said reinforcing member and projecting beyond opposite sides of such member, said grommet having outstanding annular flanges at its ends, the inner faces of which, in the normal shape of said grommet, lie in contact with the opposite sides of said reinforcing member whereby, upon the tightening of said bolt, said grommet will be deformed endwise to reduce the normal space between said inner faces of said flanges to cause them to diverge radially outwardly of the axis of said bolt to relieve any frictional contact between said inner faces and opposite sides of said reinforcing member, the remote faces of said flanges being substantially conical in shape, decreasing in thickness toward the radially outer extremities of said inner faces, continued tightening of said bolt deforming said grommet into leak-proof engagement with said reinforcing member and the adjacent sheet and with said bolt.

5. In a bolted storage tank, in combination, a pair of overlapping sheets having alined bolt-receiving openings therethrough, a reinforcing member arranged adjacent one of said sheets, said reinforcing member having a bolt-receiving opening of larger diameter than and alined with said first named openings, a grommet arranged in the opening in said reinforcing member and projecting beyond opposite sides of said reinforcing member, and a bolt passing through said grommet and through said openings, said grommet having parallel end circular portions one of which engages the head of said bolt and the other of which engages the face of said one sheet around the opening therein, said grommet having outstanding annular flanges at its ends the inner faces of which are normally substantially parallel and in engagement with opposite sides of said reinforcing member, the remote faces of said flanges being formed substantially conical to intersect said parallel flange faces in relatively sharp edges, the material of said grommet being deformable whereby, upon initial tightening of said bolt, the endwise deforming of said grommet will reduce the space between the parallel faces of said flanges to force the radially inner portions of said faces against opposite sides of said reinforcing member and thus bend said normally parallel flange faces to diverge from each other out of frictional contact with opposite sides of said reinforcing member without moving said conical faces into engagement with said one sheet, continued tightening of said bolt deforming said grommet into leak-proof engagement with said reinforcing member and said one sheet and with said bolt.

6. In a bolted storage tank, in combination, a pair of overlapping sheets, a reinforcing member arranged to one side thereof, said sheets and said reinforcing member being provided with bolt receiving openings, a bolt adapted to project through said openings, and a grommet surrounding said bolt and having a body portion projecting through and beyond both ends of the opening in said reinforcing member, the ends of said grommet having outstanding annular flanges overlying opposite sides of said reinforcing member, the remote faces of said flanges being tapered to decrease in thickness radially outwardly, said grommet having opposite circular end faces the radially outer edges of which form the radially inner limits of the respective tapered faces and the diameter of each such circular end face being less than the diameter of the bolt opening in said reinforcing member, the material of said grommet being deformable whereby the tightening of said bolt deforms said grommet into leak-proof engagement with said reinforcing member and the adjacent sheet and with said bolt.

ROBERT GRIFFIN DE LA MATER.

REFERENCES CITED

The following references are of record in the file of this patent:

UNITED STATES PATENTS

| Number | Name | Date |
| --- | --- | --- |
| 1,415,632 | Gurke | May 9, 1922 |
| 2,159,346 | Welch et al. | May 23, 1939 |
| 2,367,836 | Brown | Jan. 23, 1945 |